United States Patent Office 3,582,418
Patented June 1, 1971

3,582,418
PRODUCTION OF CRIMPED THERMOPLASTIC FIBERS
Gerrit Schuur, Delft, Netherlands, assignor to Shell Oil Company, New York, N.Y.
No Drawing. Filed Aug. 28, 1967, Ser. No. 663,567
Claims priority, application Netherlands, Aug. 31, 1966, 6612238
Int. Cl. B32b *31/14, 31/30*
U.S. Cl. 156—83                                10 Claims

ABSTRACT OF THE DISCLOSURE

Crimped narrow strips, fibers or filaments of thermoplastic compositions are produced by stretching and slitting or fibrillating multilayered films of thermoplastics consisting of coextruded layers which have significantly different stress-strain curves at identical temperatures.

---

The invention relates to the production of fibers and yarns from thermoplastic macromolecular materials, which fibers and yarns have the property of crimping and/or curling as a result of internal stresses. This crimping and/or curling gives textile material a bulkier appearance and has a favorable influence on the "feel" of the material. For the sake of simplicity, whenever reference is made in the present specification and appended claims to "crimping" only, this term means crimping and/or curling.

It is known to crimp materials by exerting external forces by means of mechanical treatments. A more permanent crimp is obtained by simultaneously spinning two different materials through the same opening of a spinneret to form a filament which consists over its entire length of two halves with considerably different mechanical properties. The heterogeneity then causes internal stresses, which if not held in equilibrium by external forces, effect a crimping of the filament. It is also known in such a method to pass, instead of different materials, chemically identical polymers in two streams to the same spinneret and to subject these streams before they reach the spinneret to dissimilar thermal treatments so that a difference in molecular weight arises. In this case also the filament composed of two halves of a different type will display internal stresses which can cause crimping.

These methods have the disadvantage that they require cumbersome, complicated and expensive equipment. Control and regulation of the desired operating conditions is far from simple. Crimped filaments are obtained in a simpler and more economic manner by the method according to the present invention.

According to this invention, multilayered films composed of thermoplastic macromolecular materials, which comprises at least two coextensive layers which at the same temperature display stress-strain curves which do not coincide, are stretched and mechanically fibrillated or divided into narrow strips parallel to the direction of stretch.

A multilayered film according to this invention comprises at least two dissimilar coextensive layers intimately adhering to each other. The length and width of such a multilayered film, as understood in this specification, are at least 10 times the thickness, usually 100 times or more, for instance 1000 times the thickness. In order to keep the specification simple, multilayered films referred to hereinafter will be films consisting of two layers. What is said, however, also refers to films comprising more than two layers provided that the internal stresses therein do not compensate each other.

Multilayered films are produced either directly, i.e., by joint extrusion of molten, or at least plastified thermoplasts through one and the same slit-shaped extrusion orifice or by separate extrusion of the layers and subsequent uniting of the layers in the plastified state, generally under pressure. Such multilayered films can be extruded in the form of a tube which is later cut open, preferably in the longitudinal direction. For convenience of reference, all such coextensive multilayered (including two-layered) films are referred to herein as laminates.

It is suitable to cut laminate into strips of from 2 to 30 mm. width and subsequent to stretch these strips. It is also possible to reverse the procedure and stretch before cutting. The method can be carried out entirely continuously, stretched endless strips being thus obtained. These can be used as yarns, if required or desired after being treated in a manner conventional in the production of yarns, such as twisting etc.

A very attractive product is obtained by first stretching the laminate and subsequently fibrillating it by rubbing, beating, tearing and similar mechanical treatments. This fibrillation is a conventional procedure in the case of single films, oriented by stretching. The orientation makes the film readily splittable. In the splitting process, of course, the orientation must be very predominant in one direction. The narrow strips resulting from the splitting process can replace natural or synthetic fibers in many applications. In addition to loose fibers, structures are also obtained which comprise narrow strips which are still connected at various points by often still narrower strips, known as fibrils.

According to the invention, this fibrillation process is applied to laminates. Despite the fact that one of the layers of the laminate will be more strongly oriented than the other layer and will thus be more susceptible to fibrillation than this other layer it has been found that if sufficient mechanical forces are applied the splitting continues in the layer which is less susceptible to fibrillation, so that in the product fibrillated according to the invention most if not all the fibers consist of two layers. If the laminate has been formed by uniting two separately extruded films which already display some degree of orientation it is desirable for effective and easy fibrillation that the directions of orientation in the two layers coincide.

The fibrillation can be effected by rubbing between rolls having a rough surface and different circumferential speeds or between rubber belts which likewise move at dissimilar speeds. Other fibrillation methods are beating, working with brushes or pins, twisting, application of a false twine, and exposure to strong air streams.

If stable fiber is required it is advisable to cut the material into pieces between the stretching and fibrillating steps. In this case the length of these pieces in the principal direction of orientation determines the longest dimension which the fibers can obtain during fibrillation. In general, the direction of cutting is transverse to the main direction of stretch. As a rule the stretching will be effected in the direction of movement of the material but it is also possible for the main direction of stretch to be transverse to the direction of movement. The fibrillation of single thermoplastic films to staple fiber is the subject matter of copending United States applications Ser. No. 615,448, filed Feb. 13, 1967 now abandoned and of U.S. Pat. 3,470,595 to Goppel, issued Oct. 7, 1969. The fibrillation of laminates to staple fiber can be carried out in an analogous manner.

A suitable apparatus for the fibrillation operation, particularly if staple fiber is required, is a carding machine. A carding machine normally comprises a rotating cylinder which cooperates with a number of similarly rotating rolls of smaller diameter, known as flats and combs. Distributed over the cylinder and the cooperating rolls are carding needles which effect the fibrillation. The fibrillated material leaves the carding machine in the form of a web. In order to increase the uniformity of the web it is possible to pass the web through a second carding machine or if required or desired through a series of carding machines. When a carding machine is used, fibrillation and carding are effected simultaneously and a separate carding operation is unnecessary. The carding machine is also suitable for uniformly mixing the fibers obtained by fibrillation of the thermoplastic films and laminates with other fibers, for instance natural fibers.

It is of course also possible to obtain staple fiber by cutting an endless product obtained in one of the ways described above into pieces of the desired length.

The thickness of a laminate used as starting material is usually between 0.01 and 3 mm. Very suitable thicknesses before stretching are between 0.03 and 1 mm.

The width of a web of thermoplastic film obtained by extrusion is usually between 10 and 100 cm. Laminate webs of identical width are suitably cut into strips, with a width of for example from 1 to 10 cm., before stretching and fibrillating. This is preferably carried out on moving bands, the direction of cutting coinciding with that of the movement. These strips are then stretched in the direction of movement.

The stretching ratios must be chosen on the basis of the effects desired and the composition of the laminate. Suitable stretching ratios are usually between 1:3 and 1:20, particularly between 1:5 and 1:15. If desired, the stretching operation can be carried out in a number of stages.

The temperature at which the stretching operation is carried out are below the softening point of the layer of the laminate which softens at the highest temperature, i.e., below the softening point of the layer of the laminate which has the highest softening point of all the layers present. In this respect the fact must be taken into account that the softening point can be raised by the influence of longitudinal forces in the direction of orientation. The stretching operation is preferably carried out at temperatures which are 10° C. to 100° C. below the softening point of the layer of the laminate with the highest softening point.

The fibrillation is preferably carried out at temperatures of the order of room temperature, at any rate preferably not at temperatures close to the softening points. Temperatures between 0° C. and 40° C. are preferable.

The fact that crimping occurs in the narrow strips, fibers and yarns obtained according to the invention arises from the fact that use is made of combinations of thermoplasts the stress-strain curves of which do not coincide at the same temperature. The requirement stated here of variation in stress-strain behavior excludes laminates which consist of layers having completely identical composition.

Internal stresses occur as a result of the common stretching of both layers of the laminate. In most cases this results in the layers being oriented in an unlike degree. In some cases, as long as the laminate has not yet been divided or fibrillated into narrow strips, these internal stresses will not cause very much change in shape.

The crimping often occurs during the fibrillation, either at room temperature or at more elevated temperature, owing to the fact that the cohesion of the fibers in the laminate is lost and ceases to hinder the crimping. If however, the laminate is maintained under a certain tension, after stretching, as may be the case in winding up, and cooled under this tension, it can happen that during later fibrillation the internal stresses in the material are too low for the crimping unless the temperature is again raised.

If the unequal orientation which results from stretching does not effect crimping sufficient to meet the requirements it is possible, subsequent to the method described, to heat to temperatures at which crimping increases. The increase in crimping under these circumstances can be explained by a reduction in the orientation which takes place to a dissimilar extent or at a dissimilar rate for the two layers of the fibers.

Suitable temperatures for this treatment are generally between 5° C. and 80° C. below the softening point of the layer in the laminate with the lowest softening point. The required period of heating depends on the composition of the laminate, the orientation in the layers, the temperature and the effect desired. The duration of heating can be experimentally determined and usually lies between several seconds and several minutes.

Prolonged heating causes the crimping to reduce again (owing to general reduction in the orientation). In this way the heating is a means for controlling the crimping.

The heating which increases or controls the crimping effect can take place, if desired, after the material has been worked up to yarns and even after the fibers or yarns have been woven or knitted or in some other way worked up to textile articles. In this way reinforcement of the crimping after the production of these textile articles makes it possible to improve their "feel" and increase their bulk, as required.

An increase (control) of the crimping effect after the stretching and fibrillation or division into narrow strips can be obtained, not only by heating, but also by moistening (with steam or water, suitably warm water), swelling (by contact with liquids acting as swelling agents) or by extraction of certain admixtures present in the thermoplasts, for example plasticizers (by means of suitable extracting agents). In all these cases the increase in crimping arises from the circumstance that one of the layers of a fiber changes its composition and volume more strongly than the other layer. It will be evident that various methods of reinforcing the crimping can also be used together.

It may sometimes be desirable deliberately to hinder the crimping immediately after the stretching and fibrillation (this is possible, as has been shown already, by winding up the stretched laminate and cooling it before the fibrillation), and to stimulate the crimping by the said after-treatments (heating, moistening, etc.) once the material has been worked up to yarns or textile articles.

Control (reduction) of the crimping by reduction of the orientation by means of heating or other treatments described above, can also if desired be effected by means of this heating or other treatment prior to the fibrillation or the division into narrow strips.

It is important for the layers in the laminates to adhere well to each other so that this cohesion is not lost during the fibrillation and also that most of the fibers consist of two layers. A good adhesion is normally encountered between macromolecular thermoplasts which resemble each other chemically. Examples of combinations of thermoplasts which adhere well together are: nylon 6 with nylon 66; the polyester of glycol and terephthalic acid and the polyester of glycol and isophthalic acid; polypropylene with random copolymers of propylene and ethylene; polypropylene with block copolymers of propylene and ethylene; polypropylene with a block copolymer containing blocks of polypropylene and blocks of a random copolymer of propylene and ethylene; polymethylacrylate with polymethylmethacrylate; polyvinylacetate with polyvinyl propionate; polyvinyl chloride with polyvinylidene chloride; cyclized rubber with polyolefins; cyclized rubber with polymer from pivalolacetone; and cyclized rubber with polyvinyl chloride. A sufficient adhesion is present between polyethylene and polypropylene in laminates obtained by joint extrusion in the process known as the film-blowing process.

A very good adhesion between the layers can be achieved by means of complete identity of the macromolecular thermoplasts in the two layers. In this case the requirement that the stress-strain curves at the same temperature of the two layers should not coincide can be met by the existence of dissimilarity between the two layers in respect of the selection and content of additives, viz. fillers, dyes, pigments, plasticizers, flow-promoting agents and the like.

The simplest case is that in which an additive is present in only one of the layers and not in the other one.

For each thermoplast the additives in question are generally those which are conventional or known for use with thermoplasts. As fillers use may in very many cases be made of inorganic substances, such as kaolin, bentonite, clay and the like. Pigments having very general applications are for instance titanium dioxide, zinc sulfide, cadmium yellow and cadmium red. A very commonly used additive is also carbon black. The difference in stress-strain behavior between two layers only one of which contains carbon black (or some pigments or dyes) becomes even greater when heating is applied since the temperature of the layers which contains the additive rises more quickly. In the choice of organic dyes the nature of the thermoplast to be colored must, of course, be taken into account; in this case, however, use can be made of substances which improve the dyeability. A difference in color between the two layers can, moreover, give very decorative effects after the crimping. Plasticizers, in particular for polyvinyl chloride, are particularly esters having a high boiling point, such as dioctyl phthalate and tricresyl phosphate. If the thermoplasts are polyolefins addition of paraffin wax facilitates flow. Additives having a corresponding function and/or additives having different functions can, of course, be used together.

The requirement that the stress-strain curves, at the same temperature, of the two layers formed from two completely identical thermoplasts should not coincide is also met if the two layers are dissimilar as regards porosity; one layer may for example be solid, and the other foamed, or both layers may be formed but have different densities, i.e., a different total pore volume per unit of volume.

A very good adhesion between the layers is also obtained in the case of the relative identity between the thermoplasts which will here be referred to as "substantial chemical identity."

By "substantial chemical identity" is understood identity in respect of at least 90 mol percent of the molecule fragments repeating in the polymer chain, said molecule fragments corresponding in their carbon skeleton with the polymerized monomer molecules, or, in the case of polycondensation products of two different functional compounds, with a condensation product formed from one molecule of one functional compound with one molecule of the other functional compound. Substantial chemical identity is thus not impaired by dissimilarity in molecular weight. As a result of the "at least 90%" condition, substantial chemical identity is not impaired by irregularities at head and tail, nor, in the case of polyethylene, by any dissimilarity in degree of branching. Also, substantially chemically identical, according to the definition given above, are copolymers which only differ by a few percent in respect of the ratio in which they have been built up from the monomers. Thus, according to this definition, the combination of a copolymer built up from propylene and ethylene in the molar ratio 50:50 and a copolymer built up from the same monomers in the ratio 60:40 is just on the edge of substantial chemical identity.

The difference in stress-strain curve required to crimp the yarns and fibers obtained from the laminate, in the event of substantial chemical identity, can be present if for the production of the laminate two thermoplastic products are chosen which are substantially chemically identical but which differ in average molecular weight, distribution of molecular weight, stereo-configuration, crystallinity and/or orientation.

A laminate of this type can be produced by dividing molten thermoplast (for example a polyolefin) into two streams and heating these at different temperatures and/or during unlike periods of time so that the average molecular weights in the two streams decrease at a different rate, and finally by extruding the two streams together through one slit-shaped orifice. The dissimilarity in average molecular weight can also be achieved at an identical temperature and with an identical period of heating of the two streams if these streams contain different concentrations of molecular weight stabilizing agents, or if a molecular weight stabilizing agent is present in only one of the streams. Stabilizing agents in the case of polyolefins are, for example, hindered phenols, in particular polyhydric phenols, such as bisphenols and trisphenols, organic sulfides, such as dilauryl thiodipropionate, organic phosphates, such as tri(nonylphenyl)phosphite, amines and many others. They are normally used in concentrations between 0.05% and 2% by weight, based on the amount of polyolefin.

A laminate consisting of layers which are substantially chemically identical but which differ in the stress-strain curve can also be produced by separately extruding at the same rate two layers with a completely identical composition, while drawing them off from the extruder at different speeds before uniting them to form a laminate. In this case, therefore, the stretching takes place in the plastic state. A corresponding effect can also be obtained by extruding together two streams of the same thermoplast, these streams being passed through geometrically different channels and/or geometrically different slit-shaped orifices. The geometrical differences which are of importance here relate to length (in the direction of the movement) and convergence.

A difference in the manner in which the thermoplastic material is crystallized can be effected by causing the crystallization to take place in the presence of substances which influence this crystallization, for instance, crystallization nucleating agents. With polyolefins, for example with polypropylene, it is possible to cause the dimensions of the spherulites to be very much smaller than usual by adding certain carboxylic acids or anhydrides or salts thereof, as nucleating agents prior to the crystallization of the polymer from the molten state. The use of such crystal nucleating agents is described, for example, in U.S. 3,207,-735, U.S. 3,207,736 and U.S. 3,207,738 to Wijga and U.S. 3,207,737 and U.S. 3,207,739 to Wales. Such crystal nucleating agents may be used in amounts of 0.05% or less up to 5% by weight, in particular between 0.1% and 1.5% by weight based on the amount of polymer.

The above-mentioned additives (fillers, pigments, dyes, plasticizers, flow-promoting agents, substances for regulating the crystallization, and/or stabilizers) can, of course, also be used (in equal or unequal concentrations) when there is only chemical identity, or no identity at all, between the thermoplasts in the two layers.

The invention is particularly advantageous in the processing of polyolefins to fibers, yarns and textile articles. Particularly good results are obtained if the polyolefins are at least 50% crystalline. Among the polyolefins, polypropylene and copolymers in which there is a weight predominance of molecule fragments originating from propylene are preferred as base material for at least one of the layers of the laminate. Polymers from pivalolactone are also excellent base materials.

The difference in stress-strain curve between the layers of the laminate can be ascertained by testing the layers of the laminate preferably separately. The test consists in subjecting strips of the individual layers to increasing stress whilst recording the percentage of elongation. In these tests the drawing rate, i.e. the percentage of elongation per minute should be constant and equal for both individual layers. The temperature of the layers at the start of the experiment should be equal for both layers. Suitable temperatures at the start of the experiment are in the range between 10° C. and the softening point of the layer which is lowest in softening point of the two. The difference in stress-strain curve is sufficient for obtaining a satisfactory crimping effect, if the individual layers show a difference in percentage of elongation of 0.1 or more under a stress which is equal for both layers and which is lower than the breaking stress of either of the layers. Usually the first experiments are carried out at room temperature, say 20° C. If starting at this temperature no sufficient difference in percentage of elongation is obtained the tests may be repeated with at the start a higher temperature in the range between 10° C. and the softening point of the layer which is lowest in softening point. If with the higher starting temperature the difference of 0.1 in percentage of elongation is found a satisfactory crimping effect can be obtained as well on condition that appropriate temperature conditions are selected.

This invention comprises also fibers, staple fibers and yarns obtained according to the method described, fabrics and knitted articles, and non-woven fabrics, i.e., textile articles obtained by interconnection of fibers but in another manner than weaving or knitting, produced from said products. The crimped fibers or filaments of this invention are also useful as filling for cushions or mattresses and as packaging material.

EXAMPLE I

This example relates to the manufacture of crimped filaments from a laminate consisting of two layers of propylene polymers which differed in respect of their average molecular weight, and which were both of equal, high isotacticity.

The polymers were tested in such a way that strips of 10 mm. width and 0.05 mm. thickness were subjected to increasing stress, the drawing rate being 100 mm./minute. The length of the strips between the clamps was 100 mm. The initial temperature was 20° C. At a stress of 1.5 kg./mm.$^2$ polymer A showed an elongation of 1.3% and polymer B an elongation of 3.5%. The difference was 2.2% which is much more than 0.1% referred to in the description as a practical minimum.

The two polymers were characterized by the following values: Polymer A: average molecular weight 310,000, melt index 2 g./10 min. Polymer B: average molecular weight 100,000, melt index 10 g./10 min. A laminate was produced by joint extrusion of these polymers through one die head. The two polymers were supplied in the molten state through two single-screw extruders. From these polymers were formed concentric tubes which were together pressed in the plastic state through an annular orifice with a diameter of 60 mm. After being air-cooled, the tube formed from two layers was cut open in the longitudinal direction. The thickness of each layer after extrusion was 0.05 mm. The laminated film was cut into strips having a width of 10 mm. The strips were then stretched in the ratio 1:10 in an oven in which the air temperature was 150° C. The introduction rate was 5 meters per minute, and the offtake rate was 50 meters per minute.

The thickness of the stretched strips was 0.03 mm.
The width of the stretched strips was 3 mm.

On being cooled immediately after the stretching operation the strips showed curl.

The same stretching was carried out on strips from the same laminate but having different widths. It was found that the radius of the curls is dependent on the width of the strip.

| Width after stretching, mm.: | Radius of curls, mm. |
| --- | --- |
| 3 | 2 |
| 1 | 1 |
| 0.5 | 0.5 |
| 0.1 | 0.2 |

The stretched strips with a width of 3 mm. were cut into pieces 10 cm. long which were further fibrillated on a wood carding machine. This increased the crimping. Finally, the carding web was contained at 130° C. for one minute, with the result that the crimping effect was further reinforced.

EXAMPLE II

A laminate was produced from two propylene polymers, having average molecular weight of 600,000 and 300,000. The thickness of each layer (before stretching) was 0.025 mm. Strips having a width of 20 mm. were stretched at 150° C. in the ratio 1:9. After fibrillation on a carding machine a strong crimping was again obtained.

EXAMPLE III

A laminate was produced from two propylene polymers, each having an average molecular weight of 300,000 (Limited Viscosity Number (LVN)=2.5), with isotacticities of 95% and 80% respectively. The thickness of each layer was 0.03 mm. Strips having a width of 20 mm. were stretched at 140° C. in the ratio 1:11. After fibrillation on the carding machine the crimping effect obtained was very satisfactory.

EXAMPLE IV

Polypropylene with a LVN of 2.5, and an isotacticity of 95% was divided before the extrusion into two streams, one of which was maintained at 220° C. for 5 minutes, and the other at 320° C. for 8 minutes. These streams were passed into a die head (as in Example I) so that a laminate was obtained in which the two layers had different average molecular weights. The thickness of each layer was 0.03 mm. After stretching at 130° C. in the ratio 1:10 and fibrillation on a carding machine the crimping was very satisfactory.

EXAMPLE V

A laminate was produced consisting of two layers, one of which consisted of polypropylene having a LVN of 2.5 mixed with 5% by weight of cadmium yellow and the other of the same polymer mixed with 1% by weight of carbon black. The thickness of the layers was 0.04 mm. Stretching was at 145° C. in the ratio 1:10. Crimping after fibrillation on a carding machine was very good.

EXAMPLE VI

A polyethylene produced under high pressure and having an average molecular weight of 200,000 was worked up to a laminate, in which the polymer in the two layers was the same, but in which one layer contained 5% by weight of paraffin wax. The thickness of the two layers was 0.05 mm. Stretching was carried out at 120° C. in the ratio 1:12. Crimping after fibrillation on a carding machine was satisfactory.

EXAMPLE VII

A laminate produced from nylon 6 and nylon 66, each of the layers of which were 0.03 mm. thick, was stretched at 160° C. in the ratio 1:8. The resulting crimp after fibrillation on the carding machine was very good.

EXAMPLE VIII

A laminate was produced from a layer of polypropylene (LVN 2.5), with a thickness of 0.025 mm., and a layer of cyclized rubber having a thickness of 0.02 mm. The stretching was carried out at 125° C. in the ratio 1:10. The resulting crimp after fibrillation on the carding machine was good.

The novel textile material of this invention may be described as crimped, thin, narrow, originally flat strips comprising at least two layers of thermoplastic material which exhibit different stress-strain curves at a given temperature. Narrow strips, in this context, includes strips having a width of 5 mm. or less, preferably 3 mm. or less, down to the width of fibers obtained by fibrillation.

I claim as my invention:

1. A method for the production of crimped textile materials from thermoplastics which comprises the steps of forming a multilayered film of about 0.01 to 3 mm. thickness by co-extrusion of at least two thin coextensive layers of thermoplastic materials which are characterized by substantially different stress-strain curves when tested individually at a given temperature, stretching said film, and subdividing it in the direction of stretch into strips comprising at least two tightly adhering layers of thermoplastic materials, which are suitable as textile materials.

2. A method for the production of crimped textile materials from polyolefins which comprises the steps of:
(a) forming a multilayered film of about 0.01 to 3 mm. thickness by coextrusion of at least two thin, coextensive layers which differ in at least one of the following factors: average molecular weight, molecular weight distribution, stereoconfiguration, crystallinity, spherulite size, porosity, content of fillers, content of plasticizer, and content of flow-promoting agents; said difference being sufficient to cause samples of the same compositions as said layers, when tested individually at increasing stress under constant and equal drawing rates and starting at equal temperatures in the range between 10° C. and the softening point of that layer which is lowest in softening point, to show a difference in percentage of elongation of at least 0.1 at equal stress below the breaking stress of any said layers;
(b) stretching said film at a ratio in the range between 1:3 and 1:20; and
(c) subdividing it in the direction of stretch into strips comprising at least two tightly adhering layers of thermoplastic material, which are suitable as textile materials.

3. A method according to claim 1 wherein said film is stretched as a moving band having a width of from 2 to 30 mm. at temperatures 10° to 100° C. below the highest temperature at which one of the layers of the film softens and is subsequently mechanically fibrillated at temperatures between 0° and 40° C.

4. A method according to claim 1 wherein the crimping effect is reinforced by heating.

5. A method according to claim 1 wherein the crimping effect is reinforced by swelling.

6. A method according to claim 1 wherein the polyolefin in at least one of the layers of the film is polypropylene.

7. A method according to claim 1 wherein said film consists of two coextruded layers of polyolefins which are chemically substantially identical.

8. A method according to claim 7 in which said film consists of two layers of chemically substantially identical stereoregular polypropylene which prior to extrusion differ sufficiently in average molecular weight to result in said difference in percentage elongation at equal stress.

9. A method according to claim 7 wherein said film consists of layers which are dissimilar in respect of the presence of stabilizers, said method comprising the step of bringing about a difference in average molecular weight between the layers by means of heat.

10. A method according to claim 7 wherein said film consists of layers which are dissimilar in respect of the presence of stabilizers, said method comprising the step of bringing about a difference in average molecular weight between the layers by means of radiant energy.

References Cited

UNITED STATES PATENTS

| | | | |
|---|---|---|---|
| 3,003,304 | 10/1961 | Rasmussen | 264—Fib. Dig. |
| 3,386,876 | 6/1968 | Wyckoff | 264—271X |
| 3,398,220 | 8/1968 | Port et al. | 161—Fib. Dig. |
| 3,398,441 | 8/1968 | Adachi et al. | 264—Fib. |

ROBERT F. BURNETT, Primary Examiner

R. O. LINKER, Jr., Assistant Examiner

U.S. Cl. X.R.

156—229, 244, 271, 272; 161—173, 175; 264—25; 147, 171